(12) United States Patent
Schell

(10) Patent No.: US 8,942,644 B2
(45) Date of Patent: Jan. 27, 2015

(54) SYSTEMS AND METHODS FOR PROTECTING MICROELECTROMECHANICAL SYSTEMS SWITCHES FROM RADIO-FREQUENCY SIGNALS USING SWITCHING CIRCUITRY

(75) Inventor: Stephan V. Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 13/294,456

(22) Filed: Nov. 11, 2011

(65) Prior Publication Data

US 2013/0122824 A1    May 16, 2013

(51) Int. Cl.
*H04B 1/46* (2006.01)
*H04B 1/00* (2006.01)

(52) U.S. Cl.
CPC .............. *H04B 1/0064* (2013.01); *H04B 1/006* (2013.01)
USPC ......... 455/82; 455/78; 455/552.1; 455/553.1; 361/8; 361/13

(58) Field of Classification Search
USPC ........ 455/78, 79, 82, 83, 552.1, 553.1; 361/8, 361/13
See application file for complete search history.

(56) References Cited

U.S. PATENT DOCUMENTS

| | | | |
|---|---|---|---|
| 6,204,819 B1 * | 3/2001 | Hayes et al. | 343/702 |
| 6,292,281 B1 | 9/2001 | Bala et al. | |
| 6,940,363 B2 * | 9/2005 | Zipper et al. | 333/103 |
| 6,961,368 B2 * | 11/2005 | Dent et al. | 375/219 |
| 7,251,499 B2 * | 7/2007 | Ella et al. | 455/552.1 |
| 7,643,256 B2 * | 1/2010 | Wright et al. | 361/8 |
| 7,737,810 B2 | 6/2010 | Chan | |
| 7,864,491 B1 * | 1/2011 | Bauder et al. | 361/13 |
| 8,238,074 B2 * | 8/2012 | Steeneken | 361/290 |
| 8,509,718 B2 * | 8/2013 | Khlat et al. | 455/193.1 |
| 2002/0101907 A1 | 8/2002 | Dent et al. | |
| 2004/0204013 A1 | 10/2004 | Ma et al. | |
| 2007/0207761 A1 | 9/2007 | LaBerge et al. | |
| 2008/0164961 A1 | 7/2008 | Premerlani | |
| 2009/0256656 A1 | 10/2009 | Huang | |
| 2009/0272634 A1 | 11/2009 | Ehlers | |

FOREIGN PATENT DOCUMENTS

| | | |
|---|---|---|
| EP | 1511184 | 3/2005 |
| EP | 1573762 | 6/2010 |

\* cited by examiner

*Primary Examiner* — Tuan A Tran
(74) *Attorney, Agent, or Firm* — Treyz Law Group; Chih-Yun Wu; Michael H. Lyons

(57) ABSTRACT

Electronic devices may be provided that contain wireless communication circuitry. The wireless communications circuitry may include microelectromechanical systems (MEMS) switches that receive radio-frequency antenna signals from antennas. The wireless communications circuitry may include switching circuitry interposed between the MEMS switches and the antennas. The switching circuitry may protect the MEMS switches from radio-frequency signals that are received by the antennas by temporarily isolating the MEMS switches from the radio-frequency signals during MEMS switch configuration processes. The switching circuitry may include a crossbar switch formed from solid state circuitry. The wireless communications circuitry may include control circuitry that controls the MEMS switches and the switching circuitry. The control circuitry may direct the switching circuitry to temporarily disconnect a selected MEMS switch from the antennas and direct the selected MEMS switch to switch from a first configuration to a second configuration while the MEMS switch is disconnected from the antennas.

17 Claims, 10 Drawing Sheets

NORMAL STATE

SWAPPED STATE

SYSTEMS AND METHODS FOR PROTECTING MICROELECTROMECHANICAL SYSTEMS SWITCHES FROM RADIO-FREQUENCY SIGNALS USING SWITCHING CIRCUITRY

This relates generally to wireless communications circuitry, and more particularly, to wireless communications circuitry having microelectromechanical systems (MEMS) switches.

Electronic devices such as portable computers and cellular telephones are often provided with wireless communication capabilities. For example, electronic devices may use long-range wireless communication circuitry such as cellular telephone circuitry and WiMax (IEEE 802.16) circuitry. Electronic devices may also use short-range wireless communication circuitry such as WiFi® (IEEE 802.11) circuitry and Bluetooth® circuitry.

Long-range wireless communications circuitry and short-range wireless communications circuitry can be configured to support multiple wireless frequency bands. For example, WiFi and Bluetooth may operate on the 2.4 GHz frequency band, whereas cellular standards may operate on the 900 MHz, 1800 MHz, and 2100 MHz Global System for Mobile Communications (GSM) frequency bands or the Long Term Evolution (LTE) bands.

Wireless communications circuitry typically includes switching circuitry to accommodate communications in multiple frequency bands. The switching circuitry is typically formed from solid state switches using materials such as silicon, gallium arsenide, gallium nitride, etc. However, solid state switching circuitry can provide poor switching characteristics in scenarios in which a wireless device is required to support many different frequency bands and/or relatively high frequencies (e.g., frequency bands at frequencies greater than 2 GHz). For example, parasitic capacitances may be associated with transistors in the solid state switches. In this scenario, capacitive coupling may cause unacceptable amounts of insertion loss at high frequencies.

It would therefore be desirable to be able to provide improved wireless communications circuitry in a wireless electronic device.

SUMMARY

Electronic devices such as wireless electronic devices may be provided with wireless communications circuitry. The wireless communications circuitry may include microelectromechanical systems (MEMS) switches that receive radio-frequency antenna signals from antennas and can be configured in different modes (e.g., configurations or states) to provide the received signals to selected ports of transceiver circuitry. The wireless communications circuitry may include switching circuitry interposed between the MEMS switches and the antennas that temporarily isolate the MEMS switches from the radio-frequency signals during MEMS switch configuration processes (e.g., when the MEMS switches are configured to switch between first and second modes).

The switching circuitry may include a crossbar switch that can be configured in normal, swapped, and protection modes (states). The crossbar switch may be formed from solid state circuitry. During the normal and swapped modes, the crossbar switch may route signals received from the antennas to the MEMS switches. During the protection modes, the crossbar switch may be configured to electrically disconnect a selected MEMS switch from the antennas.

The crossbar switch may include a terminated port that is coupled to a power supply ground terminal. During the protection modes, radio-frequency signals received from a selected antenna may be routed to the terminated port. The crossbar switch may include an additional terminated port that is coupled to an additional power supply ground terminal. During the protection modes, a selected MEMS switch may be coupled to the additional power supply ground terminal. By coupling the selected antenna and/or the selected MEMS switch to the power supply ground terminals, the MEMS switch may be isolated from radio-frequency signals that are received by the antennas.

The wireless communications circuitry may include control circuitry that controls the MEMS switches and the switching circuitry. The control circuitry may direct the switching circuitry to electrically disconnect a selected MEMS switch from the antennas and direct the selected MEMS switch to switch from a first configuration to a second configuration while the MEMS switch is disconnected from the antennas. The control circuitry may direct the switching circuitry to reconnect the selected MEMS switch to the antennas after the MEMS switch has switched to the second configuration.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support multiple radio access technologies (communications protocols and/or standards). For example, an electronic device may support communications with a Global System for Mobile Communications (GSM) radio access technology, a Universal Mobile Telecommunications System (UMTS) radio access technology, a Code Division Multiple Access (CDMA) radio access technology (e.g., CDMA2000 1×RTT or other CDMA radio access technologies), a Long Term Evolution (LTE) radio access technology, and/or other radio access technologies.

In some embodiments, an electronic device may be described that supports at least two radio access technologies such as LTE and CDMA2000 1×RTT (sometimes referred to herein as "1×"). Other radio access technologies may be supported if desired. The use of a device that supports two radio access technologies such as LTE and 1× radio access technologies is merely illustrative. The radio access technologies for the electronic device may be supported using shared wireless communication circuitry such as shared radio-frequency transceiver circuitry and a common baseband processor integrated circuit (sometimes referred to as a "radio").

Figure 1:
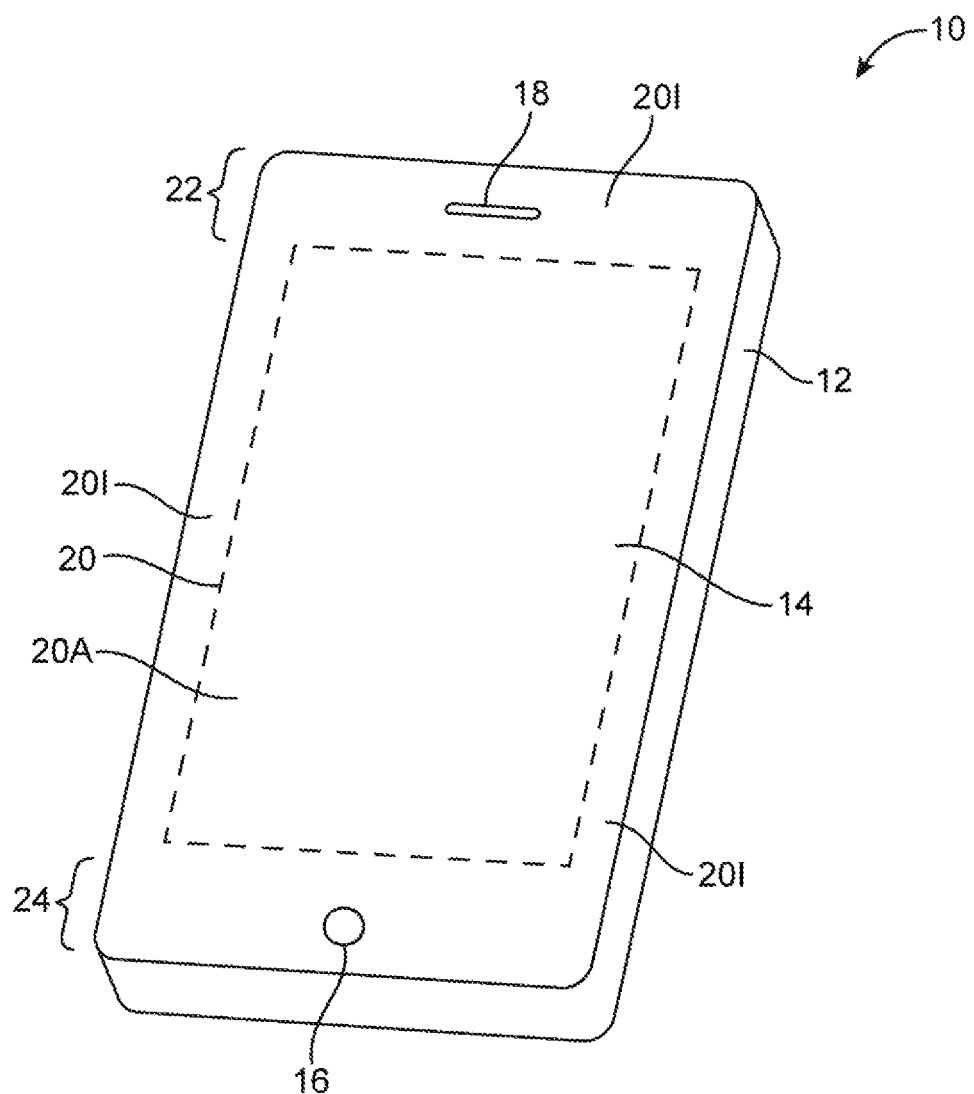
FIG. 1 is a perspective view of an illustrative electronic device with wireless communication circuitry in accordance with an embodiment of the present invention.

An illustrative electronic device with wireless communications circuitry is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover either a first subset of bands, or a second subset of bands, and thereby cover all bands of interest.

If desired, an antenna selection control algorithm that runs on the circuitry of device 10 can be used to automatically select which antenna(s) are used in device 10 in real time. Antenna selections may, for example, be based on the evaluated signal quality of received signals. The antenna selection control algorithm may direct device 10 to operate in a multiple antenna mode (e.g., a dual antenna mode) or a single antenna mode. When operating in a single antenna mode, the antenna selection control algorithm may select which of multiple antennas is to be used in transmitting and/or receiving wireless signals.

Device 10 may use one antenna, two antennas, three antennas, four antennas, or more than four antennas if desired. Device 10 may use antennas that are substantially identical (e.g., in band coverage, in efficiency, etc.), or may use other types of antenna configurations. In scenarios in which device 10 has two or more antennas, the antenna selection control algorithm may select which of the multiple antennas are used for wireless communications.

Figure 2:
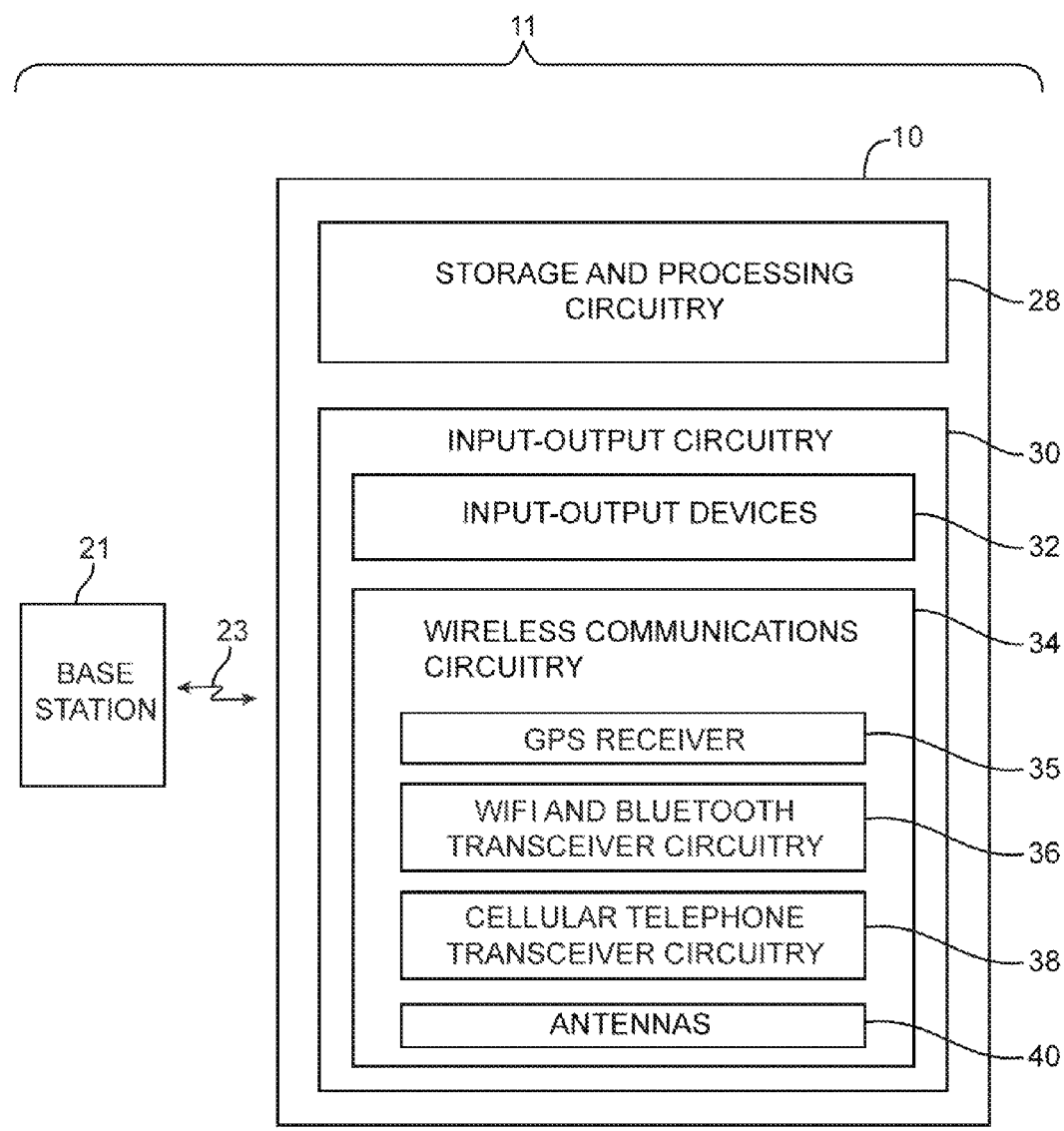
FIG. 2 is a schematic diagram of a wireless network including a base station and an illustrative electronic device with wireless communication circuitry in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communication link).

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communication circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms for device 10. The control algorithms may be used to control radio-frequency switching circuitry and other device resources. For example, a control algorithm may be used to configure wireless circuitry 34 to switch a particular antenna into use for transmitting and/or receiving signals or may switch multiple antennas into use simultaneously. The control algorithms may also be used to activate and deactivate transmitters and receivers, to tune transmitters and receivers to desired frequencies, to implement timers, to compare measured device operating parameters to predetermined criteria, etc. The control algorithms may be used to control wireless circuitry 34 to protect sensitive circuitry such as MEMS switches from potentially harmful radio-frequency sources.

In some scenarios, circuitry 28 may be used in gathering sensor signals and signals that reflect the quality of received signals (e.g., received pilot signals, received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), reference symbol received power (RSRP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information and other data may be used in controlling which antenna mode is used (e.g., single antenna mode or dual antenna mode), may be used in selecting an optimum antenna in single antenna mode (if desired), and may be used in otherwise controlling and configuring device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communication circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communication circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communication in cellular telephone bands such as bands at 700 MHz, 850 MHz, 900 MHz, 1800 MHz, 1900 MHz, and 2100 MHz or other cellular telephone bands of interest. Wireless communication circuitry 34 can include circuitry for other short-range and long-range wireless links if desired (e.g., WiMax circuitry, etc.). Wireless communication circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communication circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna (e.g., for handling WiFi® traffic or other wireless local area network traffic) and another type of antenna may be used in forming a remote wireless link antenna (e.g., for handling cellular network traffic such as voice calls and data sessions). As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
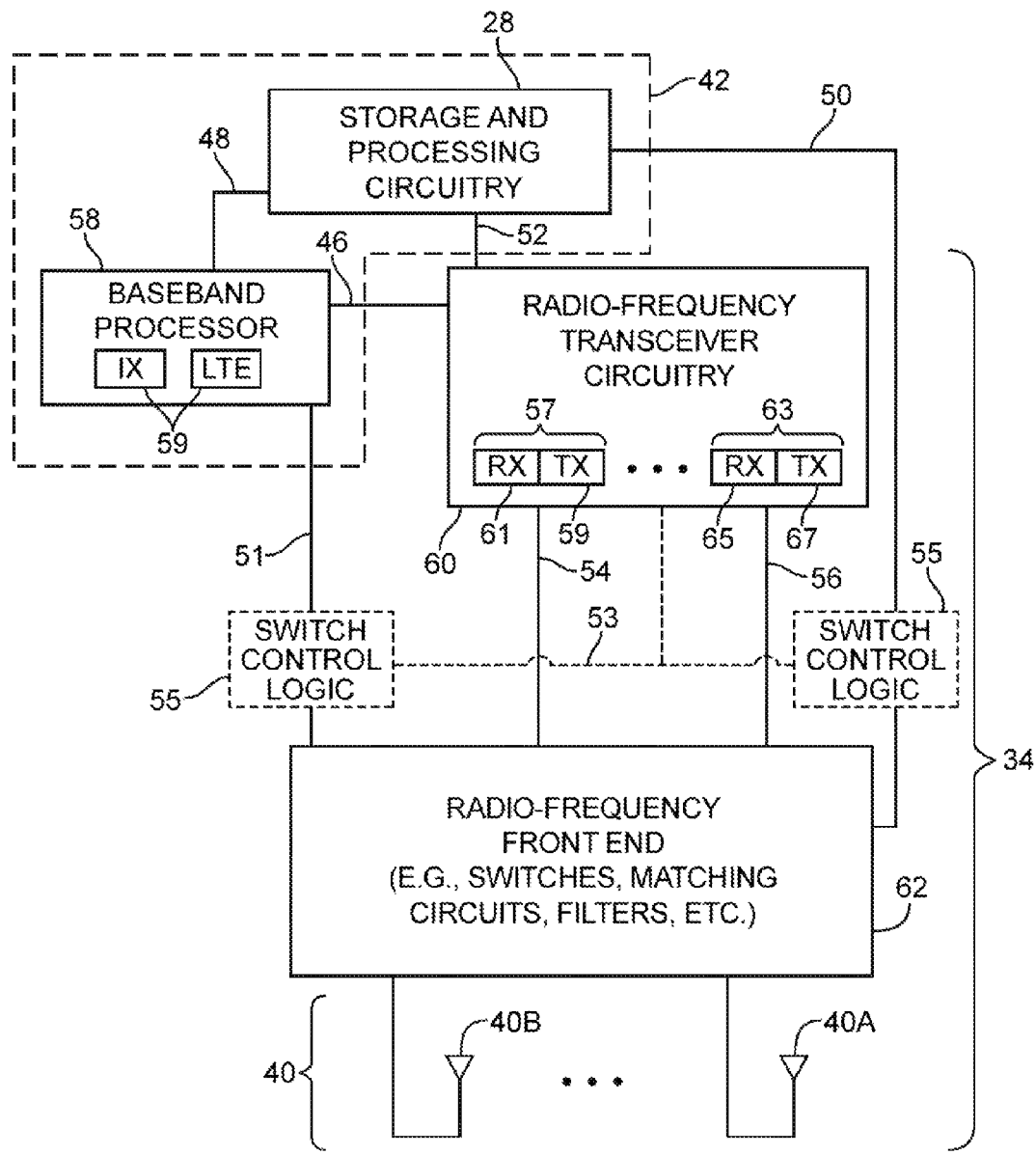
FIG. 3 is a diagram of illustrative wireless circuitry that may be used in an electronic device in accordance with an embodiment of the present invention.

Device 10 can be controlled by control circuitry that is configured to store and execute control code for implementing control algorithms. As shown in FIG. 3, control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 (e.g., a microprocessor, nonvolatile memory, volatile memory, other control circuits, etc.) via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51. The control commands may determine which antennas are used for wireless communications (e.g., by configuring appropriate switches within wireless circuitry 34).

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63. Some transceivers may include both a transmitter and a receiver. If desired, one or more transceivers may be provided with receiver circuitry, but no transmitter circuitry (e.g., to use in implementing receive diversity schemes). As shown in the illustrative configuration of FIG. 3, transceiver 57 may include a transmitter such as transmitter 59 and a receiver such as receiver 61 and transceiver 63 may include a transmitter such as transmitter 67 and a receiver such as receiver 65.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switches that are used to connect transceiver 57 to antenna 40B and transceiver 63 to antenna 40A or vice versa. If desired, the switches may be configured to selectively disconnect antennas 40A and 40B from transceivers 57 and 63. The switches may be configured by control signals received from control circuitry 42 (e.g., from an applications processor) over path 50 or from baseband processor 58 over path 51. Circuitry 42 may, for example, adjust the switches to select which antenna is being used to transmit radio-frequency signals (e.g., when it is desired to share a single transmitter in transceiver 60 between two antennas) or which antenna is being used to receive radio-frequency signals (e.g., when it is desired to share a single receiver in transceiver 60 between two antennas). In some modes of operation, a single active receiver may be used to receive incoming signals from a single antenna. In other modes of operation, multiple antennas and multiple receivers may be used in receiving signals.

If desired, switch control logic 55 may be optionally interposed between baseband processor 58 and radio-frequency front end 62 or between storage and processing circuitry 28 and radio-frequency front end 62. Switch control logic 55 may be formed from dedicated circuitry that receives control signals from control circuitry 42 (e.g., baseband processor 58 and/or storage and processing circuitry 28) and provides corresponding control signals to radio-frequency front end circuitry 62 based on the signals received from control circuitry 42. For example, baseband processor 58 may provide control signals to switch control logic 55 for routing wireless signals from transceiver 57 to antenna 40B. In this scenario, switch control logic 55 may receive the control signals from base band processor 58 and provide appropriate control signals to switches in radio-frequency front end 62 to couple transceiver 57 to antenna 40B. If desired, switch control logic 55 may be coupled to radio-frequency transceiver circuitry 60 via optional path 53. In this scenario, switch control logic 55 may provide control signals to radio-frequency front end 62 based on information received from radio-frequency transceiver circuitry 60 and/or information received from control circuitry 42.

Storage and processing circuitry 28 may be used to run software for handling more than one radio access technology. For example, baseband processor 58 may include memory and control circuitry for implementing multiple protocol stacks 59 such as protocol stack 1× and protocol stack LTE. Protocol stack 1× may be associated with a first radio access technology such as CDMA2000 1×RTT (as an example). Protocol stack LTE may be associated with a second radio access technology such as LTE (as an example). During operation, device 10 may use protocol stack 1× to handle 1× functions and may use protocol stack LTE to handle LTE functions. Additional protocol stacks, additional transceivers, additional antennas 40, and other additional hardware and/or software may be used in device 10 if desired. The arrangement of FIG. 3 is merely illustrative.

Wireless communications circuitry 34 may be required to support a broad range of frequencies. For example, wireless communications circuitry 34 may be required to accommodate wireless communications in frequency bands at 800 MHz, 850 MHz, 900 MHz, 1800 MHz, 2100 MHz, 2.4 GHz, etc. (e.g., to support cellular technologies, WiFi and Bluetooth technologies, and other wireless technologies).

Figure 4:
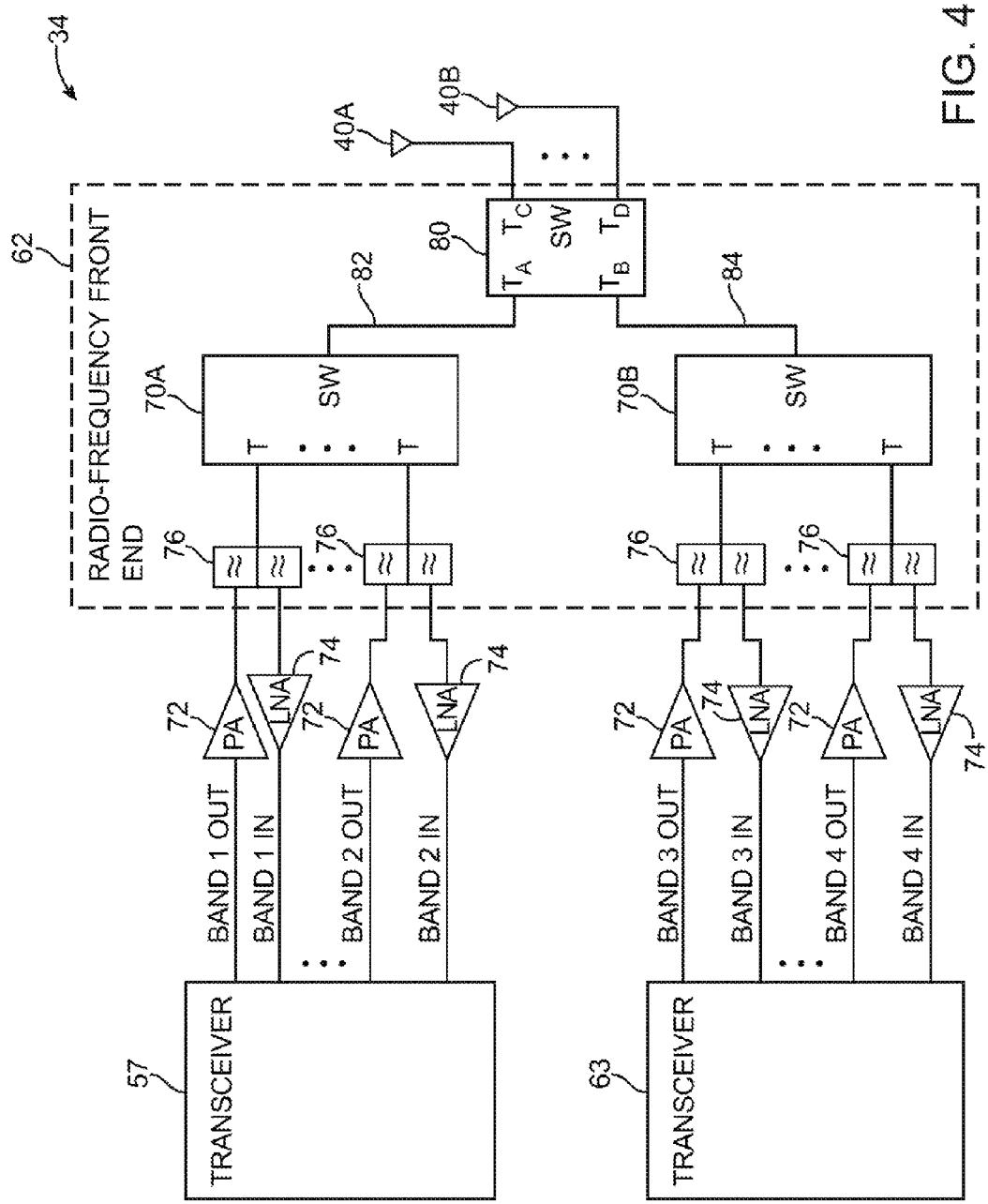
FIG. 4 is a diagram of illustrative wireless circuitry with switching circuitry that may be used to protect microelectromechanical systems (MEMS) switches in accordance with an embodiment of the present invention.

Wireless communications circuitry 34 may be provided with switching circuitry formed from microelectromechanical systems (MEMS). Switching circuits that are formed from microelectromechanical systems may sometimes be referred to as MEMS switching circuits or MEMS switches. The MEMS switches may provide wireless communications circuitry 34 with the capability of supporting multiple frequency bands across a wide range of frequencies. For example, the MEMS switches may provide reduced insertion loss and improved bandwidth in comparison to solid state switches. FIG. 4 shows an illustrative diagram in which wireless communications circuitry 34 is provided with MEMS switches 70A and 70B. MEMS switches 70A and 70B may be formed as separate switches or may be formed as first and second portions of MEMS switching circuitry (if desired).

As shown in FIG. 4, transceivers 57 and 63 may each be associated with respective frequency bands. Transceiver 57 may transmit and receive signals associated with frequency bands 1 and 2 and transceiver 63 may be associated with frequency bands 3 and 4. Frequency bands 1 and 2 may be the same as frequency bands 3 and 4 or, if desired, may be different frequency bands. Each frequency band may be associated with a respective port (terminal) of a corresponding transceiver. This example is merely illustrative. If desired, transceivers 57 and 63 may each support any number of frequency bands. Transceivers 57 and 63 may be formed as portions of a single integrated circuit (e.g., as part of radio-frequency transceiver circuitry 60).

Wireless communications circuitry 34 may include power amplifiers (PAs) 72 that amplify radio-frequency output signals that are transmitted from transceivers 57 and 63 and may include low noise amplifiers (LNAs) 74 that amplify radio-frequency input signals received by antennas 40A and 40B. For example, a power amplifier 72 may amplify output signals in frequency band 1 that are transmitted from transceiver 57 and a low noise amplifier 74 that amplifies radio-frequency signals received in frequency band 1.

Circuitry 76 may include filter circuitry such as duplexers or diplexers and may include matching circuitry. The filter circuitry in circuitry 76 may provide isolation between different frequency bands. For example, filter circuitry 76 may isolate wireless communications in band 1 from wireless communications in band 2.

If desired, circuitry 76 may include switching circuitry that is configured to switch between a first configuration associated with wireless transmission and a second configuration associated with wireless reception. For example, the switching circuitry may be configured in a first configuration in which a corresponding power amplifier 72 is coupled to a MEMS switch and a second configuration in which a corresponding low noise amplifier 74 is coupled to the MEMS switch. This example is merely illustrative. If desired, MEMS switches 70A and 70B may be coupled directly to power amplifiers 72 and low noise amplifiers 74 via respective terminals T and may be configured to switch between wireless transmission and wireless reception.

Transceivers 57 and 63 may be coupled to antennas 40A and 40B via MEMS switches 70A and 70B and switching circuit 80. Radio-frequency signals that are received by antennas 40A and 40B in any given frequency band may be routed to an appropriate transceiver by configuring switches 70A, 70B, and 80. For example, radio-frequency signals that are associated with frequency band 1 may be routed between transceiver 57 and antenna 40A by configuring MEMS switch 70A to couple a port (terminal) T associated with frequency band 1 to port TA of switch 80 and configuring switch 80 to couple port TA to port TC (e.g., because port TC is coupled to antenna 40A).

MEMS switches 70A and 70B may be formed using physical cantilevers that are actuated by voltage control signals. The cantilevers may be formed from metals, metal alloys, or other conductive materials. The cantilevers may be controlled to physically couple ports of the MEMS switches to a MEMS switch output. Control signals having relatively high voltages (e.g., tens of volts) may be required to actuate the cantilevers. The relatively high voltages may be provided by charge pumps (not shown) that are associated with the MEMS switches.

Switch 80 may be controlled to select which antenna is coupled to transceivers 57 and 63. For example, switch 80 may perform swapping functions between a first configuration in which transceiver 57 is electrically coupled to antenna 40A and transceiver 63 is electrically coupled to antenna 40B (e.g., port TC is coupled to port TA and port TD is coupled to port TB) and a second configuration in which transceiver 57 is electrically coupled to antenna 40B and transceiver 63 is electrically coupled to antenna 40A (e.g., port TC is coupled to port TB and port TD is coupled to port TA). Switch 80 may be formed as a crossbar switch. If desired, switch 80 may be a solid state switch formed from one or more transistors. For example, switch 80 may be formed using gallium arsenide field-effect transistors (FET), metal-oxide-semiconductor field-effect transistors (MOSFET), p-i-n diodes, high-electron mobility transistors (HEMT), pseudomorphic HEMT (PHEMT), transistors formed using silicon-on-insulator (SOI) or silicon-on-sapphire (SOS) technologies, or other types of transistors.

Antennas 40A and 40B may receive radio-frequency transmissions from other operating transceivers in device 10 or from other wireless devices. For example, antenna 40A may receive radio-frequency signals that are transmitted by antenna 40B. As another example, antenna 40A may receive radio-frequency transmissions from a nearby WiFi access point, cellular base station, or other wireless device.

The reliability of MEMS switches 70A and 70B may be undesirably affected by radio-frequency transmissions that are received by antennas 40A and 40B during switching operations. For example, each port of MEMS switch 70A may have a respective cantilever (or other mechanical switching structure) that is configured to selectively couple that port T to path 82. In this scenario, a switch configuration process may be performed to switch the cantilevers from a first configuration (mode) in which a first port is coupled to path 82 (e.g., coupled to a terminal associated with path 82) to a second configuration (mode) in which a second port is coupled to path 82. During the switch configuration process, MEMS switch 70A can potentially be damaged by radio-frequency signals that are present at ports of the switch (e.g., radio-frequency signals that are received by antenna 40A from other wireless devices or from transceiver 63). For example, contacts that are associated with the cantilevers in MEMS switch 70A may be damaged by arc welding or pitting associated with the presence of radio-frequency signals during the switch configuration process. Configuring a MEMS switch from a first configuration to a second configuration may sometimes be referred to herein as performing a MEMS switch configuration process. Performing a MEMS switch configuration process while radio-frequency signals are present at ports of the MEMS switch may sometimes be referred to as hot switching.

Switch 80 may provide protection for MEMS switches 70A and 70B against radio-frequency signals that are received by antennas 40A and 40B. Switch 80 may be less susceptible than MEMS switches 70A and 70B to damage associated with radio-frequency signals that are present at ports (terminals) of the switch during switching processes of switch 80. For example, switch 80 may be a solid state switch formed from transistors that are less susceptible to damage from radio-frequency signals. FIGS. 5A, 5B, 5C, and 5D show an illustrative switch 80A that may be configured in different states (configurations) to provide protection for MEMS switches 70A and 70B. Switch 80A may receive control signals via path 92 that configure switch 80A in a selected one of the states shown in FIGS. 5A, 5B, 5C, and 5D. In other words, path 92 may include path 51, path 53, and/or path 50. The control signals may be received from baseband processor 58 via path 51 or from storage and processing circuitry 28 via path 50 (e.g., as shown in FIG. 3). If desired, the control signals may be received from switch control logic 55 that is interposed between baseband processor 58 and switch 80A or between storage and processing circuitry 28 and switch 80A.

The example of FIG. 4 in which transceivers 57 and 63 each performs transmit and receive functions is merely illustrative. If desired, each transceiver may perform any combination of transmit and receive functions. For example, transceiver 57 may perform transmit and receive functions while transceiver 63 may perform only receive functions (e.g., receive diversity functions). In this scenario, power amplifiers 72 that are coupled to transceiver 63 may be optional (e.g., because transceiver 63 only performs receive functions).

Figure 5A:
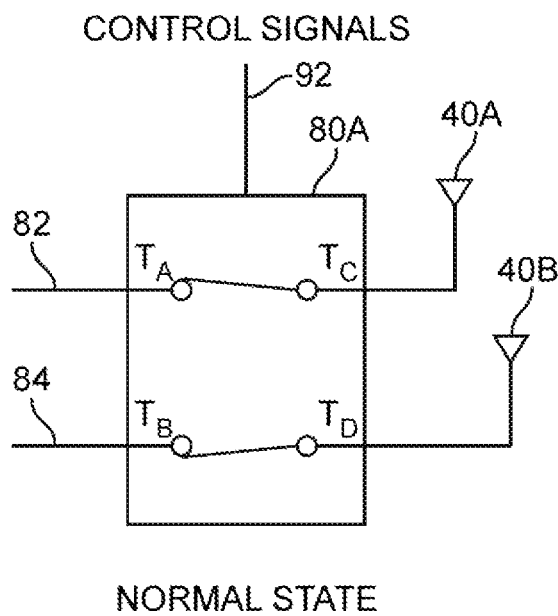
FIGS. 5A-5D are diagrams showing various states of an illustrative crossbar switch that may be used to protect MEMS switches in accordance with an embodiment of the present invention.
Figure 5B:
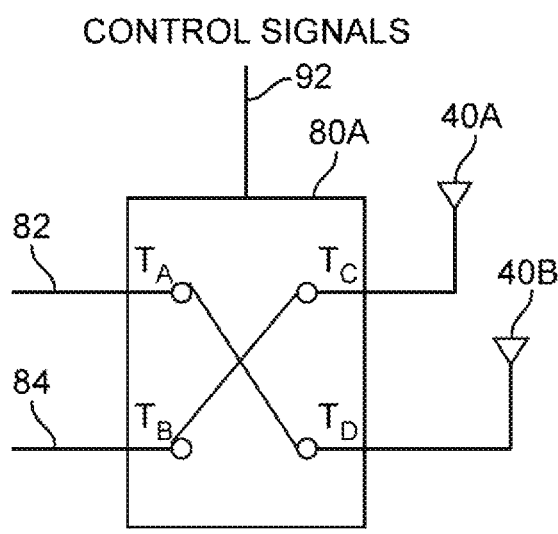

As shown in FIG. 5A, switch 80A may be configured (e.g., by control signals CTL) in a normal state in which port TA is electrically coupled to port TC and port TB is electrically coupled to port TD. As shown in FIG. 5B, switch 80A may be configured in a swapped state in which port TA is electrically coupled to port TD and port TB is electrically coupled to port TC. In the normal and swapped states, transceivers such as transceiver 57 and 63 may transmit and receive radio-frequency signals via antennas 40A and 40B.

During the normal and swapped states, radio-frequency signals that are received by antennas 40A and 40B can potentially be provided to MEMS switches 70A and 70B via switch 80A. To prevent the radio-frequency signals from reaching MEMS switches 70A and 70B, switch 80A may be configured in an A-protected state as shown in FIG. 5C or a B-protected state as shown in FIG. 5D.

Figure 5C:
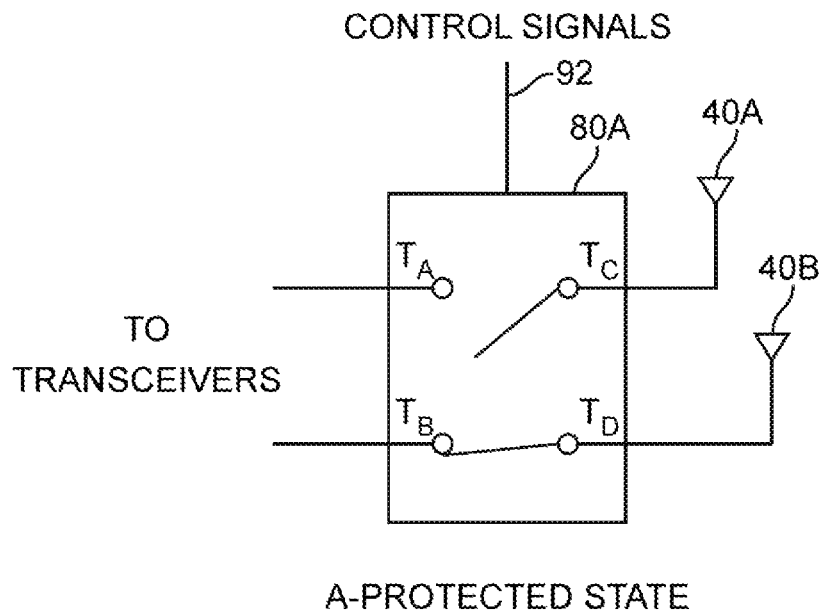
Figure 5D:
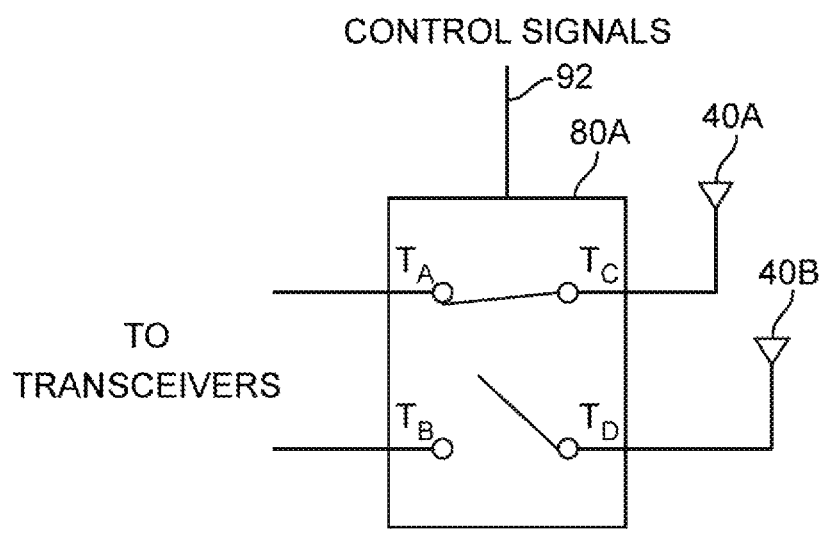

In the A-protected state of FIG. 5C, switch 80A may be configured (e.g., by control signals received via path 92) to electrically disconnect port TA from port TC while maintaining a connection between ports TB and TD. By electrically disconnecting port TA from port TC, switch 80A may protect sensitive circuitry that is coupled to port TA from radio-frequency signals that are received from antenna 40A (e.g., switch 80A may protect MEMS switch 70A in the A-protected state). In the B-protected state of FIG. 5D, switch 80A may be configured to protect MEMS circuitry that is coupled to port TB by electrically disconnecting port TB from port TD while maintaining a connection between ports TA and TC.

Figure 6:
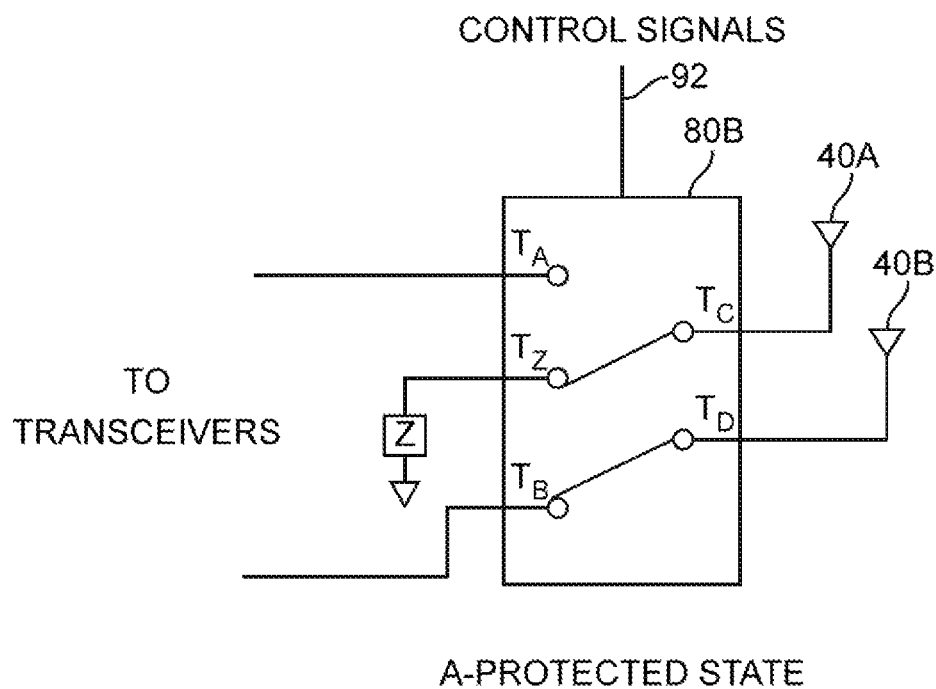
FIG. 6 is a diagram of an illustrative switching circuit with a terminated port in accordance with an embodiment of the present invention.

In some scenarios, it may be desirable to provide MEMS switches such as switches 70A and 70B with additional protection against radio-frequency signals that are received by antennas 40A and 40B. FIG. 6 shows an illustrative switch 80B that may be used to provide improved protection to MEMS switches. As shown in FIG. 6, switch 80B may have a terminated port TZ that is grounded through a load Z. Load Z may be impedance matched to antennas 40A and 40B (e.g., load Z may have a 50 ohm resistance or other impedance suitable for impedance matching antennas 40A and 40B). Switch 80B may be placed in an A-protected state by electrically coupling port TC to terminated port TZ and maintaining a connection between ports TB and TD. By electrically coupling ports TC and TZ, radio-frequency signals that are received by antenna 40A may be grounded through load Z, thereby isolating port TA and MEMS switches that are coupled to port TA from the received signals. Switch 80B may be placed in a B-protected state in a similar fashion (e.g., by electrically coupling port TD to port TZ).

Figure 7:
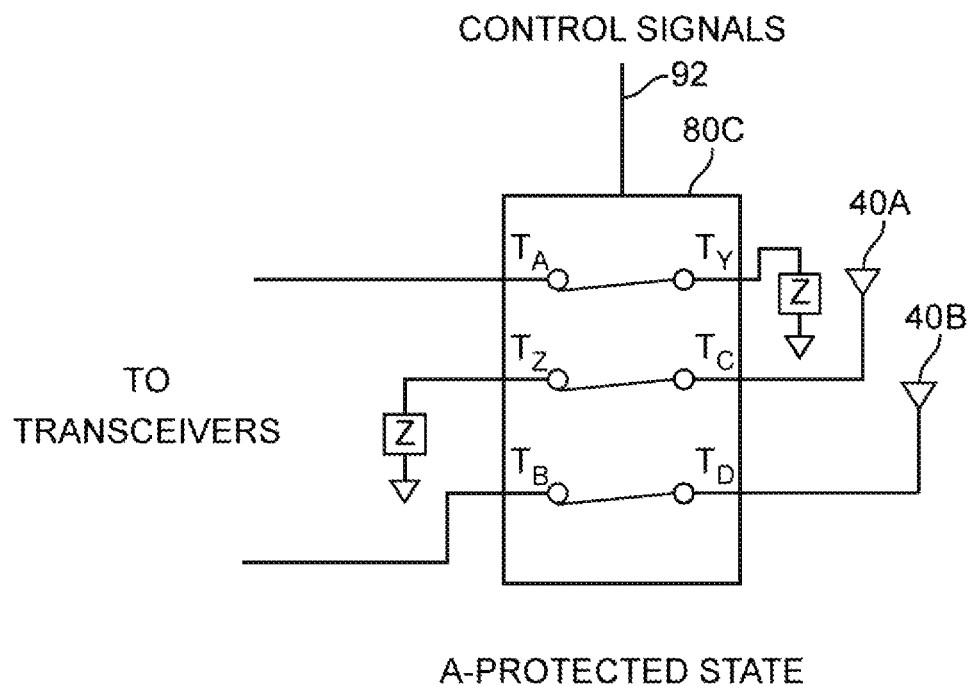
FIG. 7 is a diagram of illustrative switching circuitry with first and second terminated ports in accordance with an embodiment of the present invention.

FIG. 7 shows an illustrative switch 80C having yet more additional protection for MEMS switches. Switch 80C has a first terminated port TZ and a second terminated port TY. Switch 80C may be configured in an A-protected state by electrically coupling port TA to TY, TZ to TC, and TB to TD. By coupling port TC to TZ, radio-frequency signals received by antenna 40A may be grounded. By coupling port TA to TY, radio-frequency signals that couple onto port TA from antenna 40A (e.g., via parasitic capacitances between ports TA and TZ or between ports TA and TC) may also be grounded, thereby reducing radio-frequency signal power that is provided to sensitive circuitry such as MEMS switches that are coupled to port TA.

Figure 8:
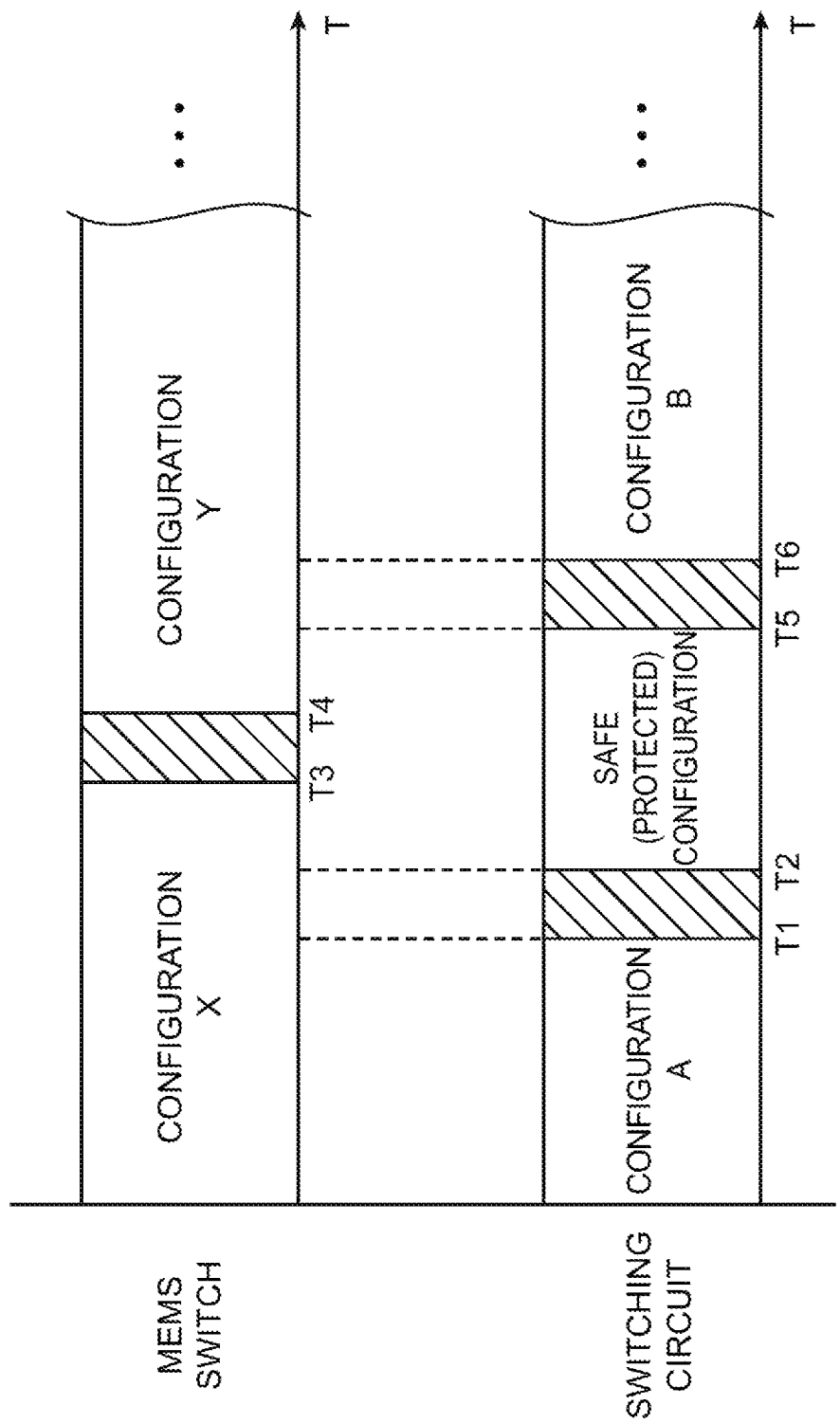
FIG. 8 is a timing diagram showing how switching circuitry may be configured to protect a MEMS switch in accordance with an embodiment of the present invention.

It may be desirable to protect MEMS switches 70A and 70B during MEMS switch configuration processes while maintaining normal operation when MEMS switches 70A and 70B are in stable configurations. FIG. 8 shows an illustrative timing diagram showing how a switching circuit (e.g., switch 80A, 80B, or 80C) may be configured to temporarily protect a MEMS switch (e.g., switch 70A or 70B) during a MEMS switch configuration process.

As shown in FIG. 8, the MEMS switch may initially have a configuration X and the switching circuit may initially have a configuration A. For example, the MEMS switch may be configured to couple a port T associated with frequency band 1 to port TA of the switching circuit and the switching circuit may be configured to couple port TA to port TC. At time T1, the switching circuit may be configured to switch into a safe configuration (e.g., a state such as the A-protected state of FIG. 5C in which the MEMS switch is isolated from radio-frequency signals). The switching circuit may stabilize in the safe configuration at time T2 (e.g., because the switching circuit may require time T2-T1 to switch between configuration A and the safe configuration). Time T2-T1 may, for example, be a time period associated with a system clock period of wireless communications circuitry 34 or the delay associated with turning off transistors in the switching circuit.

At time T3, the MEMS switch may be configured to switch from initial configuration X to configuration Y. The MEMS switch configuration process may require time T4-T3 to complete. T4-T3 may, for example, be a time period between one and ten microseconds. The MEMS switch configuration process may include the actuation of one or more cantilevers between first and second positions (as an example). At time T4, the MEMS switch configuration process may be completed and the MEMS switch may stabilize into configuration Y.

At time T5, the switching circuit may be configured to switch from the safe configuration into configuration B. Configuration B may be a normal state determined by control signals received from a baseband processor, control circuitry, or other processing circuitry. For example, configuration B may be the original configuration of the switching circuit (e.g., configuration A) or may be a different configuration.

By configuring the switching circuit into a safe configuration before configuring the MEMS switch and throughout the MEMS switch configuration process, the MEMS switch may be protected from potentially harmful radio-frequency sources.

Figure 9:
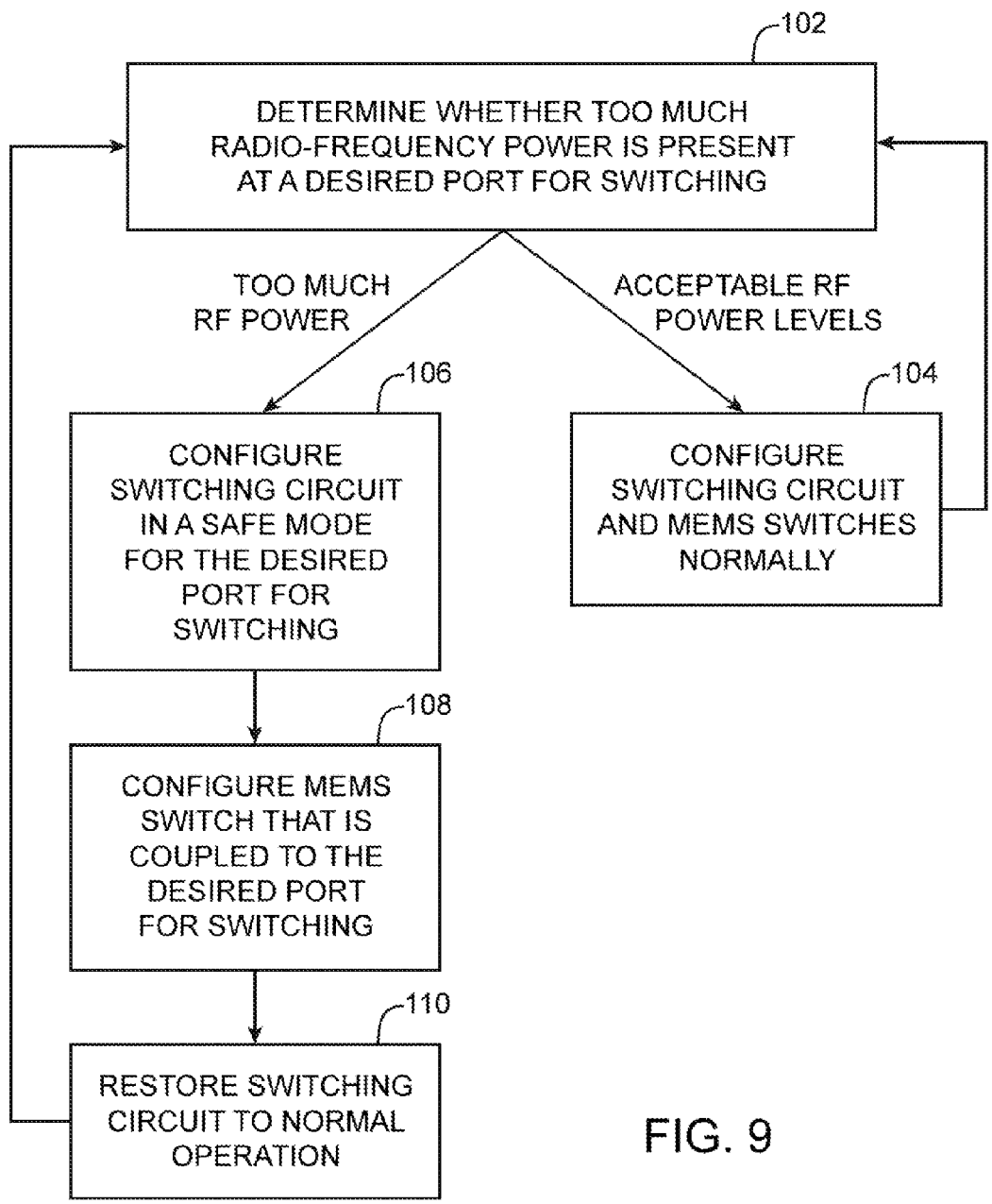
FIG. 9 is a flowchart of illustrative steps that may be performed to protect MEMS switches from radio-frequency transmissions by configuring switching circuitry in accordance with an embodiment of the present invention.

Control circuitry such as baseband processor 58, storage and processing circuitry 28, or switch control logic 55 may be configured to provide switches 70A, 70B, and 80 of radio-frequency front end 62 with appropriate control signals to protect MEMS switches during MEMS switch configuration processes. FIG. 9 shows an illustrative flowchart in which control circuitry may configure a switching circuit such as switch 80 to protect MEMS switches such as switches 70A and 70B from radio-frequency signals when switching the MEMS switches from a current configuration to a new configuration.

In step 102, the control circuitry may determine whether too much radio-frequency power is present at a desired port for switching. For example, the control circuitry may determine whether too much radio-frequency power is being provided by antennas to ports of MEMS switches 70A and 70B (e.g., via paths 82 and 84). Acceptable levels of radio-frequency power may be determined by tolerance levels of MEMS switches 70A and 70B (e.g., the acceptable levels may depend on physical characteristics of the MEMS switches such as contact materials and cantilever materials that are used in the MEMS switches or structural design of the MEMS switches). The control circuitry may determine whether too much radio-frequency power by using data retrieved from transceivers 57, 63, baseband processor 58, or calculated by the control circuitry. For example, the control circuitry may determine that too much radio-frequency power is present at a desired port for switching when device 10 is currently communicating with a nearby base station or WiFi access point or when radio-frequency signals are received from nearby wireless devices. As another example, the control circuitry may use data such as RSSI measurements, Ec/Io data, Ec/No data, or other data to determine when too much radio-frequency power is present at a desired port for switching.

The desired port for switching may be a port that is a part of a MEMS switch that is desired to switch from the current configuration to the new configuration or a port that is associated with the MEMS switch. For example, in a normal state of switch 80, ports TA and TC may be associated with MEMS switch 70A and ports TB and TD may be associated with MEMS switch 70B. As another example, in a swapped state of switch 80, ports TA and TD may be associated with MEMS switch 70A and ports TB and TC may be associated with MEMS switch 70B.

If the control circuitry determines that acceptable power levels are present at the desired port for switching, the operations of step 104 may be performed. If the control circuitry determines that too much radio-frequency power is present at the desired port for switching, the operations of step 106 may be performed.

In step 104, the control circuitry may configure the switching circuit and the MEMS switches normally. For example, the control circuitry may simultaneously configure the switching circuit and the MEMS switches from the current configuration to the new configuration. The process may then return to step 102 to protect MEMS switches from potentially harmful radio-frequency signal sources.

In step 106, the control circuitry may configure the switching circuit in a safe mode (e.g., a safe state or configuration) for the desired port for switching. For example, if the desired port for switching is port TA of switching circuit 80A, the control circuitry may configure switching circuit 80A in the A-protected state of FIG. 5C. As another example, if the desired port for switching is port TA of switching circuit 80C, the control circuitry may configure switching circuit 80C in the A-protected state of FIG. 7.

In step 108, the control circuitry may configure the MEMS switch that is coupled to the desired port for switching (e.g., by providing appropriate control signals to the MEMS switch). For example, if the desired port for switching is port TB of switching circuit 80A, the control circuitry may configure MEMS switch 70B (e.g., because MEMS switch 70B is coupled to port TB). The MEMS switch may be configured from the current configuration into the desired new configuration.

In step 110, the control circuitry may provide the switching circuit with control signals that restore the switching circuit to normal operation. For example, the control circuitry may restore the switching circuit to a normal or swapped state from an A-protected state or from a B-protected state. The process may then return to step 102 to protect MEMS switches from potentially harmful radio-frequency signal sources.

Figure 10:
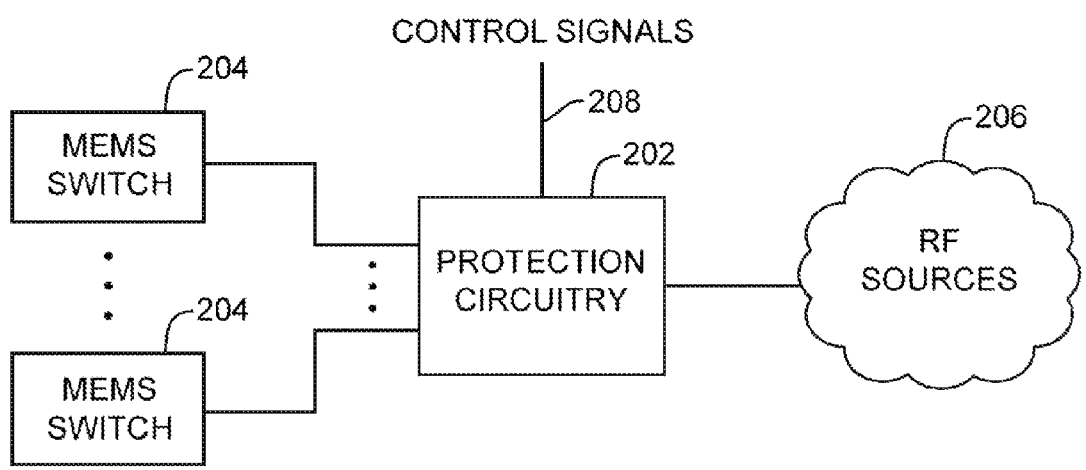
FIG. 10 shows an illustrative example in which protection circuitry may be used to protect MEMS switches from radio-frequency sources.

The example of FIGS. 4-9 in which MEMS switches are protected from radio-frequency sources by a switching circuit is merely illustrative. If desired, MEMS switches such as switches 70A and 70B may be protected from radio-frequency sources by any desired circuitry that isolates the MEMS switches from radio-frequency signals. FIG. 10 shows an illustrative example in which protection circuitry 202 may be used to protect MEMS switches 204 from radio-frequency sources 206. Radio-frequency sources 206 may be any source of radio-frequency signals (e.g., wireless transmitters, base stations, WiFi access points, etc.). As an example, radio-frequency sources 206 may include an antenna that is coupled to MEMS switch 204 and protection circuitry 202. In this scenario, the antenna may receive radio-frequency signals from other wireless devices and/or wireless transmitters.

Protection circuitry 202 may include one or more transistors that isolate one or more MEMS switches 204 from radio-frequency sources 206. For example, the gates of the transistors may be controlled by control signals provided via paths 206. If desired, protection circuitry 202 may also include diodes that may be controlled to selectively isolate MEMS switches 204. Protection circuitry 202 may be controlled via path 208 to selectively isolate MEMS switches 204 from radio-frequency sources 206. For example, protection circuitry 202 may be controlled by control circuitry that performs the steps of FIG. 9 to selectively isolate MEMS switches 204 that are coupled to desired ports for switching. If desired, control signals may be provided to protection circuitry 202 that isolate all MEMS switches 204 from radio-frequency sources 206.

MEMS switches 204 and protection circuitry 202 may be formed on a printed circuit board (PCB) as two separate dies with routing paths on the PCB that couple the two dies. If desired, MEMS switches 204 and protection circuitry 202 may be formed on a single die. By forming MEMS switches 204 and protection circuitry 202 on a single die, parasitic capacitances associated with routing paths between two separate dies may be reduced.

The foregoing is merely illustrative of the principles of this invention and various modifications can be made by those skilled in the art without departing from the scope and spirit of the invention. The foregoing embodiments may be implemented individually or in any combination.

What is claimed is:

1. Wireless electronic device communications circuitry, comprising:
    at least one microelectromechanical systems switch operable to receive radio-frequency antenna signals;
    switching circuitry operable to temporarily isolate the at least one microelectromechanical systems switch from the radio-frequency antenna signals;
    an antenna operable to provide the radio-frequency antenna signals to the microelectromechanical systems switch through the switching circuitry; and
    radio-frequency transceiver circuitry coupled to the microelectromechanical systems switch, wherein the radio-frequency transceiver circuitry has at least first and second ports, wherein the microelectromechanical systems switch has at least first and second terminals coupled respectively to the first and second ports of the radio-frequency transceiver circuitry, wherein the microelectromechanical systems switch has at least a third terminal operable to receive the radio-frequency antenna signals, wherein the microelectromechanical systems switch is operable in a first mode in which the third terminal is shorted to the first terminal and is operable in a second mode in which the third terminal is shorted to the second terminal, and wherein the switching circuitry is configured to temporarily isolate the microelectromechanical systems switch from the radio-frequency antenna signals to protect the microelectromechanical systems switch as the microelectromechanical systems switch switches between the first and second modes.

2. The wireless electronic device communications circuitry defined in claim 1 wherein the switching circuitry comprises a solid state switch coupled between the antenna and the third terminal of the microelectromechanical systems switch.

3. The wireless electronic device communications circuitry defined in claim 1 wherein the switching circuitry comprises an antenna selection switch operable to selectively couple the antenna to the radio-frequency transceiver circuitry.

4. Wireless electronic device communications circuitry, comprising:
    at least one microelectromechanical systems switch operable to receive radio-frequency antenna signals;
    switching circuitry operable to temporarily isolate the at least one microelectromechanical systems switch from the radio-frequency antenna signals;
    an antenna operable to provide the radio-frequency antenna signals to the microelectromechanical systems switch through the switching circuitry;
    radio-frequency transceiver circuitry coupled to the microelectromechanical systems switch, wherein the switching circuitry comprises an antenna selection switch operable to selectively couple the antenna to the radio-frequency transceiver circuitry; and
    an additional antenna, wherein the antenna selection switch is operable in at least a first mode in which the antenna is coupled to the radio-frequency transceiver circuitry, a second mode in which the additional antenna is coupled to the radio-frequency transceiver circuitry, and a third mode in which the microelectromechanical systems switch is isolated from the first and second antennas so that the microelectromechanical systems switch is isolated from the radio-frequency antenna signals.

5. Wireless electronic device communications circuitry, comprising:
    at least one microelectromechanical systems switch operable to receive radio-frequency antenna signals;
    switching circuitry operable to temporarily isolate the at least one microelectromechanical systems switch from the radio-frequency antenna signals; and
    an antenna operable to provide the radio-frequency antenna signals to the microelectromechanical systems switch through the switching circuitry, wherein the switching circuitry comprises a first port coupled to the microelectromechanical systems switch, a second port coupled to the antenna, and a third port that is coupled to a power supply ground terminal, wherein the switching circuitry is operable to temporarily isolate the at least one microelectromechanical systems switch from the radio-frequency signals by coupling the second port to the third port and isolating the first port.

6. The wireless electronic device communications circuitry defined in claim 5, wherein the switching circuitry comprises a third port coupled to an additional power supply ground terminal, wherein the switching circuitry is operable to temporarily isolate the at least one microelectromechanical systems switch from the radio-frequency signals by coupling the second port to the third port, coupling the first port to the fourth port and isolating the first port.

7. Wireless communications circuitry comprising:
    at least first and second antennas;
    radio-frequency transceiver circuitry;
    microelectromechanical systems switching circuitry coupled between the first and second antennas and radio-frequency transceiver circuitry; and
    a crossbar switch having a first port coupled to the first antenna, a second port coupled to the second antenna, a third port coupled to a first portion of the microelectromechanical systems switching circuitry, a fourth port coupled to a second portion of the microelectromechanical systems switching circuitry, wherein the crossbar switch is operable in a normal mode, a swapped mode, and a protection mode in which the third port is simultaneously isolated from the first and second ports.

8. The wireless communications circuitry defined in claim 7 wherein the crossbar switch is configured so that, during the normal mode, signals from the first antenna are routed from the first port of the crossbar switch to the third port of the crossbar switch and signals from the second antenna are routed from the second port of the crossbar switch to the fourth port of the crossbar switch.

9. The wireless communications circuitry defined in claim 7 wherein the crossbar switch is configured so that, during the swapped mode, signals from the first antenna are routed from the first port of the crossbar switch to the fourth port of the crossbar switch and signals from the second antenna are routed from the second port of the crossbar switch to the third port of the crossbar switch.

10. The wireless communications circuitry defined in claim 7 wherein the crossbar switch is further operable in an additional protection mode in which the fourth port is simultaneously isolated from the first and second ports.

11. The wireless communications circuitry defined in claim 7 wherein the crossbar switch further comprises a fifth port that is coupled to a power supply ground terminal, wherein the crossbar switch is configured so that, during the protection mode, signals from the first antenna are routed from the first port of the crossbar switch to the fifth port and signals from the second antenna are routed from the second port to the fourth port.

12. The wireless communications circuitry defined in claim 11 wherein the crossbar switch further comprises a sixth port that is coupled to an additional power supply ground terminal, wherein the crossbar switch is further configured so that, during the protection mode, the third port is coupled to the sixth port.

13. A method of operating wireless communications circuitry having at least one antenna, at least one microelectromechanical systems switch coupled to the antenna, switching circuitry coupled between the microelectromechanical systems switch and the antenna, and control circuitry operable to control the microelectromechanical systems switch and the switching circuitry, the method comprising:
  with the control circuitry, directing the switching circuitry to electrically disconnect the microelectromechanical systems switch from the antenna;
  with the control circuitry, directing the microelectromechanical systems switch to switch from a first configuration to a second configuration while the microelectromechanical systems switch is disconnected from the antenna; and
  with the control circuitry, directing the switching circuitry to reconnect the microelectromechanical systems switch to the antenna after the microelectromechanical systems switch has switched from the first configuration to the second configuration.

14. The method defined in claim 13 wherein the switching circuitry comprises a first port coupled to the antenna, a second port coupled to the microelectromechanical systems switch, and a third port coupled to a power supply ground terminal and wherein directing the switching circuitry to electrically disconnect the microelectromechanical systems switch from the antenna comprises directing the switching circuitry to couple the first port to the third port.

15. The method defined in claim 14 wherein the switching circuitry further comprises a fourth port coupled to an additional power supply ground terminal and wherein directing the switching circuitry to electrically disconnect the microelectromechanical systems switch from the antenna further comprises directing the switching circuitry to couple the second port to the fourth port.

16. The method defined in claim 14 wherein directing the switching circuitry to reconnect the microelectromechanical systems switch to the antenna comprises:
  directing the switching circuitry to disconnect the first port from the third port; and
  directing the switching circuitry to couple the first port to the second port.

17. The method defined in claim 13 wherein the microelectromechanical systems switch is coupled to a port of the switching circuitry, the method further comprising:
  with the control circuitry, determining whether power levels of radio-frequency signals at the port exceed acceptable power levels, wherein directing the switching circuitry to electrically disconnect the microelectromechanical systems switch from the antenna comprises:
  in response to determining that the power levels exceed acceptable power levels, directing the switching circuitry to electrically disconnect the microelectromechanical systems switch from the antenna.

* * * * *